(12) United States Patent
Callejas et al.

(10) Patent No.: US 12,344,757 B2
(45) Date of Patent: Jul. 1, 2025

(54) METHOD FOR PREPARING COATING COMPOSITION WITH IMPROVED COLOR RETENTION

(71) Applicant: Rohm and Haas Company, Collegeville, PA (US)

(72) Inventors: Juan F. Callejas, Audubon, PA (US); Melinda L. Einsla, Royersford, PA (US); Jeffrey J. Sobczak, Coatesville, PA (US); Mark D. Westmeyer, Collegeville, PA (US)

(73) Assignee: Rohm and Haas Company, Collegeville, PA (US)

( * ) Notice: Subject to any disclaimer, the term of this patent is extended or adjusted under 35 U.S.C. 154(b) by 500 days.

(21) Appl. No.: 17/919,797

(22) PCT Filed: Apr. 12, 2021

(86) PCT No.: PCT/US2021/026856
§ 371 (c)(1),
(2) Date: Oct. 19, 2022

(87) PCT Pub. No.: WO2021/216312
PCT Pub. Date: Oct. 28, 2021

(65) Prior Publication Data
US 2023/0145320 A1 May 11, 2023

Related U.S. Application Data

(60) Provisional application No. 63/014,860, filed on Apr. 24, 2020.

(51) Int. Cl.
| C09D 133/04 | (2006.01) |
| C09D 7/61 | (2018.01) |
| C09D 7/65 | (2018.01) |
| C09D 7/80 | (2018.01) |

(52) U.S. Cl.
CPC ............ *C09D 133/04* (2013.01); *C09D 7/61* (2018.01); *C09D 7/65* (2018.01); *C09D 7/80* (2018.01)

(58) Field of Classification Search
CPC .......... C09D 133/04; C09D 7/80; C09D 7/65; C09D 7/61
USPC ........................................................ 524/413
See application file for complete search history.

(56) References Cited

U.S. PATENT DOCUMENTS

| 5,074,912 A | 12/1991 | Liles et al. |
| 5,110,684 A | 5/1992 | Cooper |
| 5,776,245 A | 7/1998 | Thomas |
| 5,814,411 A | 9/1998 | Merrifield et al. |
| 6,472,024 B1 | 10/2002 | Schwartz et al. |
| 7,531,242 B2 | 5/2009 | Vockler et al. |
| 9,557,403 B2 | 1/2017 | Eldic |
| 2007/0240614 A1 | 10/2007 | Lynch |
| 2013/0149536 A1* | 6/2013 | Kostelnik ............... C08K 9/06 524/588 |
| 2014/0228511 A1 | 8/2014 | Li et al. |
| 2016/0362556 A1* | 12/2016 | Lehmann ............... C09K 21/14 |

FOREIGN PATENT DOCUMENTS

| WO | 2013023174 | 2/2013 |
| WO | 2020198490 | 10/2020 |

* cited by examiner

*Primary Examiner* — Deve V Hall
(74) *Attorney, Agent, or Firm* — Reid S. Willis

(57) ABSTRACT

The present invention relates to a process for preparing a blend of comprising an aqueous dispersion of polymer particles, a PMHS, an opacifying pigment, and an extender. The blend of the present invention is useful in exterior paint applications, especially where retention of color in the painted substrate is important.

13 Claims, No Drawings

METHOD FOR PREPARING COATING COMPOSITION WITH IMPROVED COLOR RETENTION

BACKGROUND OF THE INVENTION

The present invention relates to a method of preparing a coating composition that exhibits improved color retention when coated on a substrate.

Color retention, which is defined by the color loss (or fading) of organic coatings on substrates arising from photodegradation, is highly desirable for exterior coatings. Premature and excessive fading typically occurs on surfaces with excessive exposure to sunlight, which can also exacerbate chalking of the coating. Color loss arises mechanistically from UV degradation, which accelerates chemical changes in the coloring agents by way of hydroxy and peroxy radical generation, which in turn lead to the onset of photo-oxidation (or photochemical degradation) in most polymers.

Color retention in pigmented coating formulations is especially challenging. $TiO_2$ pigment particles, which are invariably present in paints, while providing excellent hiding, strongly absorb UV radiation, leading to the formation of the oxidative hydroxyl radicals. Techniques used to mitigate the adverse effects of $TiO_2$ include pretreatment of the surface with $SiO_2$, $ZrO_2$, or both, which minimizes, but does not eliminate the formation of hydroxy radicals.

Attempts to mitigate the effects of UV light and $TiO_2$ on color loss in pigmented coatings include incorporating UV absorbers and antioxidants into paint formulations. These additives tend to have limited effectiveness over time; moreover, they tend to be more effective in reducing yellowing as contrasted with reducing color fading. Accordingly, it would be advantageous in the art of exterior coatings to find a simple, effective, and cost-efficient means of reducing color fading in pigmented coatings.

SUMMARY OF THE INVENTION

The present invention addresses a need in the art by providing, in one aspect, a method for forming a blend comprising an aqueous dispersion of polymer particles, a polymethylhydrosiloxane (PMHS), an opacifying pigment, and an extender; wherein the order of addition comprises the steps of either:

a) mixing the polymethylhydrosiloxane with the aqueous dispersion of polymer particles to form a polymethylhydrogensiloxane/polymer particle blend; then mixing the polymethylhydrogensiloxane/polymer particle blend with the opacifying pigment and the extender in any order; or b) mixing the opacifying pigment with the aqueous dispersion of polymer particles to form an opacifying pigment/polymer particle blend; then mixing the opacifying pigment/polymer particle blend with polymethylhydrosiloxane and the extender in any order; or c) mixing the extender with the aqueous dispersion of polymer particles to form an extender/polymer particle blend; then mixing the extender/polymer particle blend with polymethylhydrogensiloxane and the opacifying pigment in any order; or d) adding the polymethylhydrogensiloxane to a blend comprising the aqueous dispersion of polymer particles, the pigment, and the extender;

wherein the polymethylhydrosiloxane is represented by the following formula:

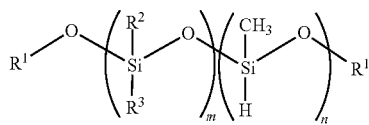

where each $R^1$ is independently H or $SiMe_3$; $R^2$ is $CH_3$ or phenyl; and $R^3$ is $C_1$-$C_{18}$-alkyl, $C_1$-$C_{18}$-alkoxy, or phenyl; m is from 0 to 199 and n is from 1 to 200.

The process of the present invention is useful for preparing pigmented paint formulations that exhibit excellent color retention when applied to substrates.

DETAILED DESCRIPTION OF THE INVENTION

The present invention is a method for forming a blend comprising an aqueous dispersion of polymer particles, a PMHS, an opacifying pigment, and an extender; wherein the order of addition comprises the steps of either:

a) mixing the PMHS with the aqueous dispersion of polymer particles to form a polymethylhydrogensiloxane/polymer particle blend; then mixing the polymethylhydrogensiloxane/polymer particle blend with the opacifying pigment and the extender in any order; or b) mixing the opacifying pigment with the aqueous dispersion of polymer particles to form an opacifying pigment/polymer particle blend; then mixing the opacifying pigment/polymer particle blend with PMHS and the extender in any order; or c) mixing the extender with the aqueous dispersion of polymer particles to form an extender/polymer particle blend; then mixing the extender/polymer particle blend with PMHS and the opacifying pigment in any order; or d) adding the polymethylhydrogensiloxane to a blend comprising the aqueous dispersion of polymer particles, the pigment, and the extender;

wherein the PMHS is represented by the following formula:

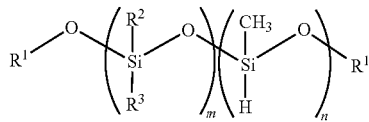

where each $R^1$ is independently H or $SiMe_3$; $R^2$ is $CH_3$ or phenyl; and $R^3$ is $C_1$-$C_{18}$-alkyl, $C_1$-$C_{18}$-alkoxy, or phenyl; m is from 0 to 199 and n is from 1 to 200.

The PMHS is preferably a homopolymer (m=0) or a copolymer where m>0 and $R^2$ and $R^3$ are each independently $CH_3$; in another embodiment, m is 0 to 99 and n is 1 to 100. In a first aspect, the PMHS is blended in a first step with an aqueous dispersion of polymer particles (a latex), examples of which include polyacrylic, poly(styrene-acrylic), polyvinyl acetate, and polyurethane based latexes. In a second step, the PMHS/polymer particle blend is mixed with pigment and extender, either together or separately, and in any order. As used herein, "opacifying pigment" refers to a metal oxide having a refractive index of greater than 2.0. Suitable opacifying pigments include $TiO_2$ and $ZnO_2$. Suitable extenders include carbonates, silica, silicates, aluminosilicates, phosphates, and non-hollow organic microspheres. More particular examples of extenders include talc, clay, mica, sericite, CaCO$_3$, nepheline syenite, feldspar, wollastonite, kaolinite, dicalcium phosphate, and diatomaceous earth.

The concentration of the PMHS is preferably in the range of 0.1 to 5 weight percent, based on the weight of the blend (composition). The weight-to-weight ratio of the PMHS to the total of the opacifying pigment and the extender is preferably in the range of from 0.5:1, more preferably from 0.2:1, and most preferably from 0.1:1, to 0.001:1, more preferably to 0.005:1, and most preferably to 0.01:1. The preferred ratio of PMHS to opacifying pigment is in the range of from 0.8:1, more preferably from 0.4:1, and most preferably from 0.2:1, to 0.002:1, more preferably to 0.01:1, and most preferably to 0.05:1. TiO$_2$ is a preferred opacifying pigment.

In a second aspect, opacifying pigment is mixed with the aqueous dispersion of polymer particles to form an opacifying pigment/polymer particle blend, followed by mixing the opacifying pigment/polymer particle blend with the PMHS and the extender, either together or separately, and in any order.

In a third aspect, extender is mixed with the aqueous dispersion of polymer particles to form an extender/polymer particle blend; followed by mixing the extender/polymer particle blend with the PMHS and the opacifying pigment, either together or separately, and in any order.

In a fourth aspect, the PMHS is added to a blend comprising the aqueous dispersion of polymer particles, the pigment, and the extender. Significantly, the process of the present invention excludes contact of the PMHS with extender or pigment without the presence of the aqueous dispersion of polymer particles.

In another aspect, the total amounts of pigment and extender used in the process of the present invention are such that the composition has a pigment volume concentration (PVC) above a critical PVC. The term "critical pigment volume concentration" (CPVC) refers to the lowest concentration of polymer required to wet the surface of the pigment particles. Above CPVC, the volume of binder is insufficient to coat all pigment and extender. In a further aspect, the process of the present invention forms a composition with a PVC of at least 60%, alternatively at least 65% and, in one aspect, not greater than 90%.

In yet another aspect, the total amounts of pigment and extender used in the process of the present invention are such that the composition has a pigment volume concentration (PVC) below a critical PVC. "Critical pigment volume concentration" (CPVC) refers to the lowest concentration of polymer required to wet the surface of the pigment particles. In this aspect, the process of the present invention forms a composition with a PVC not greater than 60%, or not greater than 50%, and, in one aspect, at least 10%, or at least 25%, or at least 35%.

The CPVC of a coating can be conveniently determined using reflectance (integrated sphere, spectral reflectance included, 10 degree observer/D65), as follows: The difference in reflectance of a coated film in the dry state is compared to the same film that has been rewetted with a penetrating solvent that has refractive index similar to that of the polymer (such as Isopar L solvent) that fills the air voids of the dry coating. When a coating is above CPVC, the Y-reflectance of the re-wetted coating will decrease by at least 2% from the initial Y-reflectance value of the dry coating. PVC is defined by the following formula:

$$PVC = \left[\frac{\text{Vol Pigment} + \text{Extender}}{\text{Vol Pigment} + \text{Extender} + \text{Binder Solids}}\right] \times 100$$

where binder solids refers to the contribution of polymer from the aqueous dispersion of the polymer particles that bind the pigment and extender particles together.

The process of the present invention preferably further includes the addition of any or all of solvents, rheology modifiers, defoamers, dispersants, preservatives, coalescents, neutralizing agents, colorants, and additional water. The preferred order of addition of these materials is readily determined by those of ordinary skill in the art without undue experimentation.

It has been surprisingly been discovered that exterior paints prepared using the process of the present invention provide coatings with exceptional color retention when subjected to accelerated UV exposure.

Examples

Above-critical paint formulations were prepared in accordance with Table 1. In the table, PRIMAL™ WDV-2001 refers to PRIMAL™ WDV-2001 Acrylic Copolymer (46.5% solids); METHOCEL™ J75MS refers to METHOCEL™ J75MS Cellulose Ether; Nopco NXZ refers to Nopco NXZ Defoamer; Calgon N refers to Calgon N (10%) Dispersant; TAMOL™ 165 A refers to TAMOL™ 165 A Dispersant (21%); Ti-Pure R-746 refers to Ti-Pure R-746 TiO$_2$; Attagel 50 refers to Attagel 50 Attapulgite; Minex 4 refers to Minex 4 Nepheline syenite extender; Durcal (Omyacarb 2) refers to Durcal (Omyacarb 2) CaCO$_3$; Durcal (Omyacarb 40) refers to Durcal (Omyacarb 40) CaCO$_3$; Temisca #15 refers to Temisca #15 sand; Unimin 50-30 refers to Unimin 50-30 sand; Rozone 2000 refers to Rozone 2000 Preservative; DOWANOL™ refers to DOWANOL™ DPnB Coalescent; PMHS/PDMS refers to the polymethylhydrosiloxanes/polydimethyl siloxane polymers illustrated in Table 2. PRIMAL, METHOCEL, TAMOL, and DOWANOL are all Trademarks of The Dow Chemical Company or Its Affiliates.

TABLE 1

Above-Critical Paint Formulations

| Ingredient | (g) |
| --- | --- |
| PRIMAL ™ WDV-2001 | 230.4 |
| METHOCEL ™ J75MS | 1.60 |
| Nopco NXZ | 1.60 |
| Calgon N | 16.00 |
| TAMOL ™ 165A | 3.00 |
| Ti-Pure R-746 | 136.80 |
| Durcal (or Omyacarb) 2 | 95.70 |
| Durcal (or Omyacarb) 40 | 79.80 |
| Temisca #15 | 191.50 |
| Unimin 50-30 | 780.30 |
| Rozone 2000 | 1.60 |
| DOWANOL ™ DPnB | 6.40 |
| NaOH (10%) | 3.20 |
| PMHS/PDMS$^a$ | $^a$ |
| Water | 31.94 |
| Totals | 1579.80 |
| Total PVC | 82.7 |

$^a$See Table 2

Five PMHS and one PDMS siloxane polymers were added to the paint formulations at 0.5 weight percent based on the weight of the formulations. The polymers are summarized in Table 2:

TABLE 2

Polysiloxanes

PMHS 1 - XIAMETER™ MHX-1107 Fluid (100% MeSiH)
PMHS 2 - Gelest HMS 501 Dimethylsiloxane Copolymer (45-55% methylhydrosiloxane)
PMHS 3 - Gelest HMS 301 Dimethylsiloxane Copolymer (25-35% methylhydrosiloxane)
PMHS 4 - Gelest HMS-151 Dimethylsiloxane Copolymer (15-18% methylhydrosiloxane)
PMHS 5 - Gelest HMS-071 Dimethylsiloxane Copolymer (6-7% methylhydrosiloxane)
PDMS - Dow Corning 1Q-3563 PDMS
XIAMETER is a Trademark of The Dow Chemical Company or Its affiliates.

The paint formulations were pigmented with Colortrend Blue 888-7214 dye (1 wt %) and applied to an aluminum panel (3.2 mm thickness). The coated panels were allowed to dry at 25° C. at 50% relative humidity, then subjected to accelerated UV exposure for 5000 h using a Ci 5000 xenon arc Weather-O-Meter (Atlas Corp.) set at ASTM G-155 cycle 1 (102 min daylight followed by 18 min water spray on the coated surface.) The radiance was set at 0.35 W/m².

ΔE was measured using a Byk-Gardner Spectro-Guide Colorimeter in accordance with ASTM D-1925. The greater the ΔE, the poorer the color retention. In general a ΔE of greater than 1 is perceptible to the human eye. Table 3 illustrates the color retention (ΔE) at 5000 h for coatings formed from the above-critical paint formulations (PVC=82.7) containing no polysiloxane additive, a PMHS additives 1-5, and the PDMS additive.

TABLE 3

Color Retention for Above-Critical Paint Formulations with and without Polysiloxane Additives

| Paint Example | Polysiloxane Additive | ΔE |
|---|---|---|
| Comparative 1 | None | 15.1 |
| Comparative 2 | PDMS | 10.3 |
| Example 1 | PMHS 1 | 4.8 |
| Example 2 | PMHS 2 | 5.2 |
| Example 3 | PMHS 3 | 5.0 |
| Example 4 | PMHS 4 | 6.3 |
| Example 5 | PMHS 5 | 6.6 |

Table 4 illustrates the components and amounts of a below-critical paint formulation. In the following table, Rocima 63 refers to Rocima 63 Microbicide; TERGITOL™ 15-S-9 refers to TERGITOL™ 15-s-9 Secondary Alcohol Ethoxylate; Bioban IPBC 40-LE refers to Bioban IPBC 40-LE Antimicrobial; Foamstar A-34 refers to Foamstar A-34 Defoamer; RHOPLEX™ VSR-50 refers to RHOPLEX™ VSR-50 Acrylic Latex; ACRYSOL™ RM-8W and ACRYSOL™ RM-2020 NPR refer to ACRYSOL™ RM-8W and ACRYSOL™ RM-2020 NPR Rheology Modifier. TERGITOL, RHOPLEX, and ACRYSOL are all Trademarks of The Dow Chemical Company or Its Affiliates.

The paint formulations were pigmented with Colortrend Blue 808-7214 dye (3 wt %) and applied to an aluminum panel (0.25 mm thickness). The accelerated UV testing was carried out as described hereinabove.

TABLE 4

Below-Critical Paint Formulation with No PMHS Additive

| Grind | (g) |
|---|---|
| Ti-Pure R-746 | 272.26 |
| ROCIMA™ 63 | 10.00 |
| Bioban IPBC 40-LE | 6.00 |
| TERGITOL™ 15-S-9 | 2.00 |
| TAMOL™ 165A | 19.50 |
| Foamstar A-34 | 1.00 |
| Omyacarb 8 | 144.37 |
| Omyacarb 2 | 66.52 |
| RHOPLEX™ VSR-50 | 492.07 |
| Texanol | 13.38 |
| Foamstar A-34 | 0.50 |
| ACRYSOL™ RM-8W | 2.40 |
| ACRYSOL™ RM-2020 NPR | 10.00 |
| Water | 113.44 |
| Totals | 1153.45 |
| PVC | 40.00 |

Table 5 illustrates the color retention (ΔE) at accelerated UV exposure for 2000 h for coatings formed from below-critical paint formulations (PVC=40) containing no polysiloxane additive (Comparative Example 3) and PMHS 1 at 0.5 weight percent based on the weight of the formulation of Table 4 (Example 6).

TABLE 5

Color Retention for Below-Critical Paint Formulations with and without Polysiloxane Additive

| Paint Example | Polysiloxane Additive | ΔE |
|---|---|---|
| Comparative 3 | None | 7.0 |
| Example 6 | PMHS 1 | 1.9 |

The color retention data support the significance of methylhydrosiloxane functionality in the siloxane additive. Though not bound by theory, it is believed that hydrosilane groups, unlike the methylsilane groups, can chemically bind to extender and pigment particles, thereby limiting the migration of the PMHS, which acts to mitigate the effects of UV degradation during the accelerated weathering test.

The invention claimed is:

1. A method for forming a blend comprising an aqueous dispersion of polymer particles, a polymethylhydrosiloxane (PMHS), an opacifying pigment, and an extender; wherein the order of addition comprises the steps of either:
    a) mixing the PMHS with the aqueous dispersion of polymer particles to form a polymethylhydrogensiloxane/polymer particle blend; then mixing the polymethylhydrogensiloxane/polymer particle blend with the opacifying pigment and the extender in any order; or
    b) mixing the opacifying pigment with the aqueous dispersion of polymer particles to form an opacifying pigment/polymer particle blend; then mixing the opacifying pigment/polymer particle blend with PMHS and the extender in any order; or
    c) mixing the extender with the aqueous dispersion of polymer particles to form an extender/polymer particle blend; then mixing the extender/polymer particle blend with PMHS and the opacifying pigment in any order; or
    d) adding the polymethylhydrogensiloxane to a blend comprising the aqueous dispersion of polymer particles, the pigment, and the extender;
    wherein the PMHS is represented by the following formula:

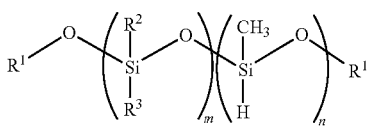

where each $R^1$ is independently H or $SiMe_3$; $R^2$ is $CH_3$ or phenyl; and $R^3$ is $C_1$-$C_{18}$-alkyl, $C_1$-$C_{18}$-alkoxy, or phenyl; m is from 0 to 199 and n is from 1 to 200.

2. The method of claim 1 wherein each $R^1$ is trimethylsilyl; $R^2$ and $R^3$ are each methyl; m is 0 to 99; and n is 1 to 100.

3. The method of claim 1 wherein the pigment is $TiO_2$; the extender is a carbonate, silica, a silicate, an aluminosilicate, a phosphate, or non-hollow organic microspheres; and the aqueous dispersion of polymer particles is an aqueous dispersion of polyacrylic or poly(styrene-acrylic) polymer particles.

4. The method claim 3 wherein the extender is talc, clay, mica, sericite, $CaCO_3$, nepheline, feldspar, wollastonite, kaolinite, dicalcium phosphate, or diatomaceous earth.

5. The method claim 1 wherein the concentration of the PMHS is in the range of 0.1 to 5 weight percent, based on the weight of the blend.

6. The method of claim 4 wherein the weight-to-weight ratio of the PMHS to the total of the opacifying pigment and the extender is in the range of from 0.2:1 to 0.005:1.

7. The method of claim 6 wherein the weight-to-weight ratio of the PMHS to the total of the opacifying pigment and the extender is in the range of from 0.1:1 to 0.01:1; and the ratio of PMHS to opacifying pigment is in the range of from 0.2:1 to 0.05:1; wherein the total amounts of pigment and extender are such that the composition has a pigment volume concentration above a critical pigment volume concentration.

8. The method of claim 6 which further includes the addition of at least one of the following components: a solvent, a rheology modifier, a defoamer, a dispersant, a preservative, a coalescent, a neutralizing agent, or a colorant.

9. The method of claim 1 comprising mixing the PMHS with the aqueous dispersion of polymer particles to form a polymethylhydrogensiloxane/polymer particle blend; then mixing the polymethylhydrogensiloxane/polymer particle blend with the opacifying pigment and the extender in any order.

10. The method of claim 1 comprising mixing the opacifying pigment with the aqueous dispersion of polymer particles to form an opacifying pigment/polymer particle blend; then mixing the opacifying pigment/polymer particle blend with PMHS and the extender in any order.

11. The method of claim 1 comprising mixing the extender with the aqueous dispersion of polymer particles to form an extender/polymer particle blend; then mixing the extender/polymer particle blend with PMHS and the opacifying pigment in any order.

12. The method of claim 1 wherein the PMHS is added to the blend comprising the aqueous dispersion of polymer particles, the pigment, and the extender, wherein at least one of the following components is combined with the blend prior to addition of the PMHS: a solvent, a rheology modifier, a defoamer, a dispersant, a preservative, a coalescent, a neutralizing agent, or a colorant.

13. The method of claim 5 wherein the wherein the total amounts of pigment and extender are such that the composition has a pigment volume concentration below a critical pigment volume concentration.

\* \* \* \* \*